United States Patent
Liu et al.

(10) Patent No.: US 11,107,194 B2
(45) Date of Patent: Aug. 31, 2021

(54) NEURAL NETWORK FOR ENHANCING ORIGINAL IMAGE, AND COMPUTER-IMPLEMENTED METHOD FOR ENHANCING ORIGINAL IMAGE USING NEURAL NETWORK

(71) Applicant: BOE Technology Group Co., Ltd., Beijing (CN)

(72) Inventors: Hanwen Liu, Beijing (CN); Pablo Navarrete Michelini, Beijing (CN); Dan Zhu, Beijing (CN); Lijie Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/755,044

(22) PCT Filed: Aug. 19, 2019

(86) PCT No.: PCT/CN2019/101391
§ 371 (c)(1),
(2) Date: Apr. 9, 2020

(87) PCT Pub. No.: WO2020/168699
PCT Pub. Date: Aug. 27, 2020

(65) Prior Publication Data
US 2021/0233214 A1 Jul. 29, 2021

(30) Foreign Application Priority Data
Feb. 18, 2019 (CN) .......................... 201910123432.4

(51) Int. Cl.
*G06T 5/00* (2006.01)
*G06N 3/08* (2006.01)

(52) U.S. Cl.
CPC ............... *G06T 5/001* (2013.01); *G06N 3/08* (2013.01); *G06T 2207/20081* (2013.01); *G06T 2207/20084* (2013.01)

(58) Field of Classification Search
CPC ........ G06N 3/08; G06N 3/0454; G06N 20/00; G06N 3/04; G06N 3/084; G06N 3/0445;
(Continued)

(56) References Cited

U.S. PATENT DOCUMENTS

2018/0165508 A1 6/2018 Othman et al.
2018/0286520 A1* 10/2018 Apte ...................... G16B 20/00
(Continued)

FOREIGN PATENT DOCUMENTS

| CN | 106504199 A | 3/2017 |
| CN | 106780522 A | 5/2017 |

(Continued)

OTHER PUBLICATIONS

International Search Report & Written Opinion dated Nov. 22, 2019, regarding PCT/CN2019/101391.
(Continued)

*Primary Examiner* — Ajibola A Akinyemi
(74) *Attorney, Agent, or Firm* — Intellectual Valley Law, P.C.

(57) ABSTRACT

A neural network is provided. The neural network includes 2n number of sampling units sequentially connected; and a plurality of processing units. A respective one of the plurality of processing units is between two adjacent sampling units of the 2n number of sampling units. A first sampling unit to an n-th sample unit of the 2n number of sampling units are DeMux units. A respective one of the DeMux units is configured to rearrange pixels in a respective input image to the respective one of the DeMux units following a first scrambling rule to obtain a respective rearranged image. An
(Continued)

(n+1)-th sample unit to a (2n)-th sample unit of the 2n number of sampling units are Mux units. A respective one of the Mux units is configured to combing respective m' number of input images to the respective one of the Mux units to obtain a respective combined image.

20 Claims, 7 Drawing Sheets

(58) Field of Classification Search
CPC ........ G06N 3/0427; G06N 3/088; G06N 5/04; G06N 3/006; G06N 3/02; G06N 3/063; G06N 7/005; G06N 20/10; G06N 3/0472; G06N 3/086; G06N 5/046; G06N 3/0481; G06N 3/049; G06N 3/082
USPC ........................................................ 382/156
See application file for complete search history.

(56) References Cited

U.S. PATENT DOCUMENTS

| 2018/0330474 | A1 | 11/2018 | Mehta et al. | |
|---|---|---|---|---|
| 2018/0342322 | A1* | 11/2018 | Apte | G16B 20/00 |
| 2019/0050534 | A1* | 2/2019 | Apte | G16H 50/70 |
| 2019/0065897 | A1* | 2/2019 | Li | G06N 20/10 |
| 2019/0138838 | A1 | 5/2019 | Liu et al. | |
| 2020/0065619 | A1 | 2/2020 | Liu et al. | |

FOREIGN PATENT DOCUMENTS

| CN | 107767343 | A | 3/2018 |
|---|---|---|---|
| CN | 107767408 | A | 3/2018 |
| CN | 107886474 | A | 4/2018 |
| CN | 108665411 | A | 10/2018 |
| CN | 108734719 | A | 11/2018 |
| CN | 109064430 | A | 12/2018 |
| CN | 109146788 | A | 1/2019 |
| CN | 109242919 | A | 1/2019 |
| CN | 109285112 | A | 1/2019 |
| WO | 2020062894 | A1 | 4/2020 |

OTHER PUBLICATIONS

First Office Action in the Chinese Patent Application No. 201910123432.4 dated Sep. 3, 2020; English translation attached.
A. Ignatov, et al., "DSLR-Quality Photos on Mobile Devices with Deep Convolutional Networks", arXiv: 1704.02470v2 [cs.CV], Sep. 5, 2017.
Hanwen Liu et al, "Deep Networks for Image-to-Image Translation with Mux and Demux Layers", Computer Vision, ECCV 2018 Workshop, pp. 150-165.

* cited by examiner

Inputting an original image to a neural network having 2n number of sampling units sequentially connected, and a plurality of processing units

↓

Processing the original image using the 2n number of sampling units, and the plurality of processing units, thereby obtaining an enhanced image

NEURAL NETWORK FOR ENHANCING ORIGINAL IMAGE, AND COMPUTER-IMPLEMENTED METHOD FOR ENHANCING ORIGINAL IMAGE USING NEURAL NETWORK

CROSS-REFERENCE TO RELATED APPLICATION

This application is a national stage application under 35 U.S.C. § 371 of International Application No. PCT/CN2019/101391, filed Aug. 19, 2019, which claims priority to Chinese Patent Application No. 201910123432.4, filed Feb. 18, 2019. Each of the forgoing applications is herein incorporated by reference in its entirety for all purposes.

TECHNICAL FIELD

The present invention relates to display technology, more particularly, to a neural network for enhancing an original image, and a computer-implemented method for enhancing an original image using a neural network.

BACKGROUND

The image enhancement is a commonly used image processing technique to improve contrast of an image, which may further improve viewing experience of the images. For example, when an image is overexposed, it looks brighter overall, and the contrast of the overexposed image is low, resulting that the scene in the overexposed image cannot be distinguished easily. The image enhancement can be used is the overexposed image to enhance the contrast of the overexposed image.

SUMMARY

In one aspect, the present invention provides a neural network for enhancing an original image, comprising 2n number of sampling units sequentially connected; and a plurality of processing units, wherein a respective one of the plurality of processing units is between two adjacent sampling units of the 2n number of sampling units; wherein a first sampling unit to an n-th sample unit of the 2n number of sampling units are DeMux units, a respective one of the DeMux units is configured to rearrange pixels in a respective input image to the respective one of the DeMux units following a first scrambling rule to obtain a respective rearranged image, and configured to divide the respective rearranged image into m number of divided images; an (n+1)-th sample unit to a (2n)-th sample unit of the 2n number of sampling units are Mux units, a respective one of the Mux units is configured to combine respective m' number of input images to the respective one of the Mux units to obtain a respective combined mage, and configured to rearrange pixels of the respective combined image following a second scramble rule to obtain an output image; the respective one of the plurality of processing units comprises a plurality of convolutional blocks sequentially connected; and m is an integer equivalent to or greater than 2, m' is an integer equivalent to or greater than 2, and n is a positive integer.

Optionally, an input to a respective convolutional block in the respective one of the plurality of processing units comprises outputs respectively from any previous convolutional blocks in the respective one of the plurality of processing units; and an output from the respective one of the plurality of processing units comprises outputs respectively from the plurality of convolutional blocks in the respective one of the plurality of processing units.

Optionally a respective one of the plurality of convolutional blocks comprises a first convolutional layer and a second convolutional layer; the first convolutional layer has kernels with a kernel size of 1*1; and the second convolutional layer has kernels with a kernel, size of 3*3.

Optionally the neural network further comprises a noise input unit configured to input noise into at least one of the plurality of processing units.

Optionally, a total number of the plurality of processing units is at least 3; and the neural network further comprises one car more concatenations configured to input an output from a respective one of the plurality of processing units to a down-streaming processing unit having a same scale as the respective one of the plurality of processing units.

Optionally, m=m'; and the first scrambling rule and the second scrambling rule are reverse with respect to each other.

Optionally, the neural network comprises (2n–1) number of processing units; and any two adjacent sampling nails of the 2n number of sampling units are connected by a respective one of the (2n–1) number of processing units.

In another aspect, the present invention provides a computer-implemented method for enhancing an original image using a neural network, comprising inputting an original image to a neural network having 2n number of sampling units sequentially connected, and a plurality of processing units, wherein a respective one of the plurality of processing units is between two adjacent sampling units of the 2n number of sampling units; and processing the original image using the 2n number of sampling units, and the plurality of processing units, thereby obtaining as enhanced image; wherein a first sampling unit to an n-th sample unit of the 2n number of sampling units axe DeMux units; an (n+1)-th sample unit to a (2n)-th sample unit of the 2n number of sampling units are Mux units; and the respective one of the plurality of processing units comprises a plurality of convolutional blocks sequentially connected; wherein, in a respective one of the DeMux units, the computer-implemented method comprises rearranging pixels in a respective input image to the respective one of the DeMux units following a first scrambling rule to obtain a respective rearranged image; and dividing the respective rearranged image into m number of divided images; wherein, in a respective one of the Mux units, the computer-implemented method comprises combining respective m' number of input images to the respective one of the Mux units to obtain a respective combined image; and rearranging pixels of the respective combined image following a second scramble rule to obtain an output image; wherein m is an integer equivalent to or greater than 2, m' is an integer equivalent to or greater than 2, and n is a positive integer.

Optionally, the computer-implemented method further comprises inputting outputs respectively from any previous convolutional blocks in the respective one of the plurality of processing units into a respective convolutional block in the respective one of the plurality of processing units; and outputting outputs respectively from the plurality of convolutional blocks in the respective one of the plurality of processing units from the respective one of the plurality of processing units.

Optionally, the computer-implemented method further comprises inputting a noise into at least one of the plurality of processing units.

Optionally, a total number of the plurality of processing units is at least 3; and the neural network further comprises one or more concatenations; the computer-implemented method further comprises inputting an output from a respective one of the plurality of processing units to a downstreaming processing unit having a same scale as the respective one of the plurality of processing units.

Optionally, m=m'; and the first scrambling rule and the second scrambling rule are reverse with respect to each other.

Optionally, the computer-implemented method further comprises training the neural network; wherein training the neural network comprises selecting a pair of a training image having a lower image quality and a reference image having a higher image quality, at least portions of the training image and the reference image in a same pair having same contents; inputting the training image to the neural network to generate a training enhanced image; comparing the training enhanced image with the reference image to obtain a loss; and tuning parameters in the neural network based on the loss.

Optionally, the computer-implemented method further comprises reiterating training the neural network using the pair of the training image and the reference image or a different pair of a training image and a reference image.

Optionally, the loss includes an L1 loss; the L1 loss is connoted rising a following equation: L1=0.299*(abs($R_I$-$R_G$))+0.587*(abs($G_I$-$G_G$))+0.114*(abs($B_I$-$B_G$)); wherein $R_I$ stands for a red component of the training enhanced image; $G_I$ stands for a green component of the training enhanced image; $B_I$ stands for a blue component of the training enhanced image; $R_G$ stands for a red component of the reference image, $G_G$ stands for a green component of the reference image; $B_G$ stands for a blue component of the reference image; and abs stands for an absolute value operation.

Optionally, the loss includes a content loss; the content loss is obtained based on a feature map of the training enhanced image and a feature map of the reference image obtained using an analysis network; the analysis network comprises a plurality of convolutional layers sequentially connected and a plurality of down sampling units; and a respective one of the plurality of down sampling unit is between two adjacent convolutional layers of the plurality of convolutional layers; wherein the content loss is computed using a following equation:

$$L_{content} = \frac{1}{2C1} \sum_{ij} (F_{ij}^l - P_{ij}^l)^2;$$

wherein $F_{ij}^l$ stands for a value of a j-th position m an i-th feature sub-map of the feature map of the training enhanced image outputted from, a l-th convolutional layer using an i-th kernel of the I-th convolutional layer; $P_{ij}^l$ stands for a value of a j-th position in an i-th feature sub-map of the feature map of the reference image outputted from the l-th convolutional layer using the i-th kernel of the I-th convolutional layer; C1 stands for a constant.

Optionally, the loss includes a color loss; the color loss is computed using a following equation: $L_{color}$=abs(gaussian (I)-gaussion(G)); wherein gaussian stands for a Gaussian blur; abs stands for an absolute value operation; I stands for the training enhanced image; G stands for the reference image.

Optionally, the loss includes an adversarial loss; the adversarial loss is computed using a following equation: LG=$E_{x\sim Pdata(x)}$[log D(x)]+$E_{z\sim Pz(z)}$[1−log D(G(z))]; wherein D stands for a discriminator which is a classifier configured to determine whether an image has an image quality equal to or greater than a threshold quality, when the image is determined to have the image quality equal to or greater than the threshold quality, the discriminator outputs 1, when the image is determined have the image quality less than the threshold quality, the discriminator outputs 0; G represents a generator (e.g., a convolutional neural network); Pdata stands for a plurality of images having image qualities equal to or greater than the threshold quality; x stands for a respective one of the plurality of images Pdata having image qualities equal to or greater than the threshold quality; Pz stands for a plurality of images having image qualities lower than the threshold quality; z stands for a respective one of the plurality of images Pz having image qualities lower than the threshold quality; and E stands for expectation operator.

Optionally, the computer-implemented method further comprises training the discriminator; wherein training the discriminator comprises tuning parameters of the discriminator based on a discriminator adversarial loss of the discriminator; the discriminator adversarial loss is computed using a following equation: LD=−$E_{x\sim Pdata(x)}$ [log D(x)]−$E_{z\sim Pz(z)}$[1−log D(G(z))]; wherein D stands for a discriminator which is a classifier configured to determine whether an image has an image quality equal to or greater than a threshold quality, when the image is determined to have the image quality equal to or greater than the threshold quality, the discriminator outputs 1, when the image is determined have the image quality less than the threshold quality, the discriminator outputs 0; G represents a generator (e.g., a convolutional neural network); Pdata stands for a plurality of images having image qualities equal to or greater than the threshold quality; x stands for a respective one of the plurality of images Pdata having image qualities equal to or greater than the threshold quality; Pz stands for a plurality of images having image qualities lower than the threshold quality; z stands for a respective one of the plurality of images Pz having image qualities lower than fits threshold quality; and E stands for expectation operator.

In another aspect, the present invention provides a computer-program product composing non-transitory tangible computer-readable medium having computer-readable instructions thereon, the computer-readable instructions being executable by a processor to cause the processor to perform inputting an original image to a neural network having 2n number of sampling units sequentially collected, and a plurality of processing units, wherein a respective one of the plurality of processing units is between two adjacent sampling units of the 2n number of sampling units; and processing the original image using the 2n number of sampling units, and the plurality of processing units, thereby obtaining an enhanced image; wherein a first sampling unit to an n-th sample unit of the 2n number of sampling units are DeMux units; an (n+1)-th sample unit to a (2n)-th sample unit of the 2n number of sampling units are Mux units; and the respective one of the plurality of processing units comprises a plurality of convolutional Mode; sequentially connected; wherein, in a respective one of the DeMux units, the computer-implemented method comprises rearranging pixels in a respective input image to the respective one of the DeMux units following a first scrambling rule to obtain a respective rearranged image; and dividing the respective rearranged image into m number of divided images; wherein, in a respective one of the Mux units, the computer-implemented method comprises combining respective m' number of input images to the respective one of the Mux units to obtain a respective combined image; and rearranging pixels of the respective combined image following a second scramble rule to obtain an output image; wherein in is an m integer equivalent to or greater than 2, m' is an integer equivalent to or greater than 2, and n is a positive integer.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1A:
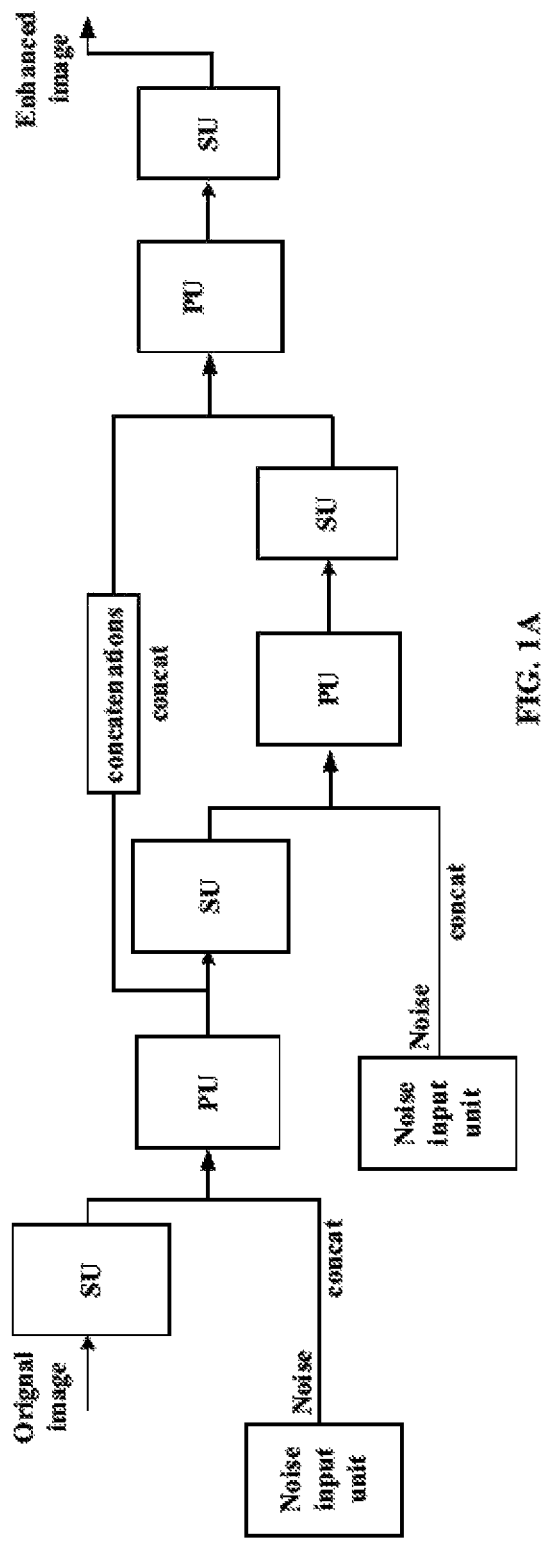
FIG. 1A is a schematic diagram of a structure of a neural network in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

It is discovered by the present disclosure that the efficiency of enhancing image using convolutional methods is relatively low, and the enhanced result is not good enough.

Accordingly, the present disclosure provides, inter alia, a neural network for enhancing an original image, and a computer-implemented method for enhancing an original image using a neural network that substantially obviate one or more of the problems due to limitations and disadvantages of the related art. In one aspect, the present disclosure provides a neural network for enhancing an original image.

In some embodiments, the neural network includes 2n number of sampling units sequentially connected; and a plurality of processing units. Optionally, a respective one of the plurality of processing units is between two adjacent sampling units of due 2n number of sampling units. Optionally, a first sampling unit to an n-th sample unit of the 2n number of sampling units are DeMux units. For example, a respective one of the DeMux units is configured to rearrange pixels in a respective input image to the respective one of the DeMux units following a first scrambling rule to obtain a respective rearranged image, and configured to divide the respective rearranged image into m number of divided images. Optionally, an (n+1)-th sample unit to a (2n)-th sample unit of the 2n number of sampling units are Mux units. For example, a respective one of the Mux units is configured to combine respective m' number of input images to the respective one of the Mux units to obtain a respective combined image, and configured to rearrange pixels of the respective combined image following a second scramble rule to obtain an output image. Optionally, the respective one of the plurality of processing units includes a plurality of convolutional blocks sequentially connected. Optionally, m is an integer equivalent to or greater than 2, m' is an integer equivalent to or greater than 2, and n is a positive integer.

As used herein, the term "convolutional kernel" also called "kernel", refers to a two-dimensional matrix used in a convolution process. Optionally, a respective one element of a plurality elements in the two-dimensional matrix has a certain value.

As used herein, the term "convolution" refers to a process of processing an image. A convolutional kernel is used in a convolution process. For example, each pixel of an input image has a value, e.g., a gray scale of a pixel. A convolution kernel starts at one pixel of the input image and moves over each pixel in an input image sequentially. At each position of the convolutional kernel, the convolutional kernel overlaps a few pixels on the image based on the size (e.g., width×height) of the convolution kernel. At a position of the convolutional kernel, a value of one of the few overlapped pixels is multiplied by a respective one value of a respective element of the convolutional kernel to obtain a multiplied value of one of the few overlapped pixels. subsequently, all multiplied values of the overlapped pixels are added to obtain a sum corresponding to the position of the convolutional kernel on the input image. By moving the convolutional kernel over each pixel of the input image, all the sums corresponding to all the position of the convolutional kernel are collected and output to form an output image. In one example, a convolution may extract different features of the input image using different convolution kernels. In another example, a convolution process may add more features to the input image using different convolution kernels.

As used herein, the term "convolutional layer" refers to a layer having one or more kernels in a convolutional neural network. The convolutional layer is used to perform convolution on an input image to obtain an output image. Optionally, different convolution kernels are used to performed different convolutions on the same input image. Optionally, different convolution kernels are used to performed convolutions on different parts of the same input image. Optionally, different convolution kernels are used to perform convolutions on different input images, for example, multiple images are inputted in a convolutional layer, a respective convolutional kernel is used to perform a convolution on a respective one of the multiple images. Optionally, different convolution kernels are used according to different situations of the input image.

As used herein, the term "active layer" refers to a layer in a convolutional neural network. As active layer can perform a non-linear mapping on an output image from a convolutional layer. Optionally, the active layer is a layer not included in a convolutional layer. Optionally, a convolutional layer includes an active layer. Various functions may be used in an active layer. Examples of functions suitable for being adopted in the active layer include, but are not limited to a rectified linear units (ReLU) function, a sigmoid function, and a hyperbolic tangent function (e.g. a tank function). For example, the active layer can transform as image (e.g., a feature map, a data, a signal) input in the active layer into a number.

As used herein, the term, "scale" refers to one or any combinations of three dimensions of as image, including one or any combinations of a width of the image, a height of the image, and a depth of the image. In one example, the scale of an image (e.g., a feature map, a data, a signal) refers to a "volume" of an image, which includes the width of the image, the height of the image, and the depth of the image. In another example, spatial scale of an image (e.g., a feature map, a data, a signal) refers to a width and length of the image, e.g., width×length.

As used herein, the term, "down-sampling" refers to a process of extracting features of an input image, and outputting an output image with a smaller scale than a scale of the input image. For example, the output image has a spatial scale (e.g., width×length) smaller than a spatial scale of the input image.

As used herein, the term "posting" refers to a type of down-sampling. Various methods may be used for pooling. Examples of methods suitable for pooling includes, but are not limited to, max-pooling, avg-polling, decimation, and demuxout.

As used herein, the term "up-sampling" refers to a process of adding features to an input image, and outputting an output image with a larger scale than a scale of the input image. For example, the output image has a spatial scale (e.g., width×height) greater than a spatial scale of the input image.

As used herein, the term "fully connected layer" is a layer connecting every neuron in one layer to every neuron in another layer. Comparing the fully connected layer with the convolutional layer, one of the differences is that scalars is used in the fully connected layer to perform the function of kernels in the convolutional layer.

As used herein, the term "Mux unit" refers to an up-scale unit executing pixel interleaving and rearrangement on a plurality of input images, so as to obtain at least one output image having a scale greater than a scale of one of the plurality of input images. As a result, the Mux unit increases a number of pixels per image by arranging and combing pixels in the plurality of input images. Optionally, four input images INPUT 4n, INPUT 4n+1, INPUT 4n+2, and INPUT 4n+3, assuming drat a number of pixels of the input images is a*b, are inputted into the Mux unit; at least one output images OUTPUT with 2a*2b pixels is outputted alter pixel rearrangement processing of the Mux unit.

In one example, the four input images INPUT 4n, INPUT 4n+1, INPUT 4n+2, and INPUT 4n+3, assuming that a number of pixels of the input images is a*b, are inputted input the Mux unit; four images OUTPUT 4n, OUTPUT 4n+1, OUTPUT 4n+2 and OUTPUT 4n+3 with 2a*2b pixels are output after pixel rearrangement processing of the 2*2 MUX unit.

In another example, the four input images INPUT 4n, INPUT 4n+1, INPUT 4n+2, and INPUT 4n+3, assuming that a number of pixels of the input images is a*b, are inputted input the Mux unit; one output image OUTPUT 4n with 2a*2b pixels is outputted after pixel rearrangement processing of the Mux unit.

As used herein, the term "DeMux unit" refers to a down-scale unit executing pixel rearrangement and dividing an input image, so as to obtain a plurality of output images having a scale smaller than a scale of the input image. As a result, the DeMux unit decreases a number of pixels per image by arranging and dividing pixels in the input images into the plurality of outfit images. Optionally, one input images INPUT mils 2a*2b pixels is inputted into the DeMux unit, four output images INPUT 4n, INPUT 4n+1, INPUT 4n+2, and INPUT 4n+3 with a*b pixels are outputted from the Demux unit.

In some embodiments, the DeMux unit is configured to rearranged pixels of a respective input image to the DeMux unit to obtain a respective rearranged image, and divide the respective rearranged image into m number of divided images (m is an integer equivalent to or greater than 2). Optionally, the pixels of the respective input image is rearranged along a first scramble rule including moving a pixel in a position A to a position B, moving a pixel previously in the position B to a position C . . . . Subsequent to rearranging the pixels of the respective input image to obtain the arranged image, the rearranged image is divided into a plurality divided images.

Figure 6:
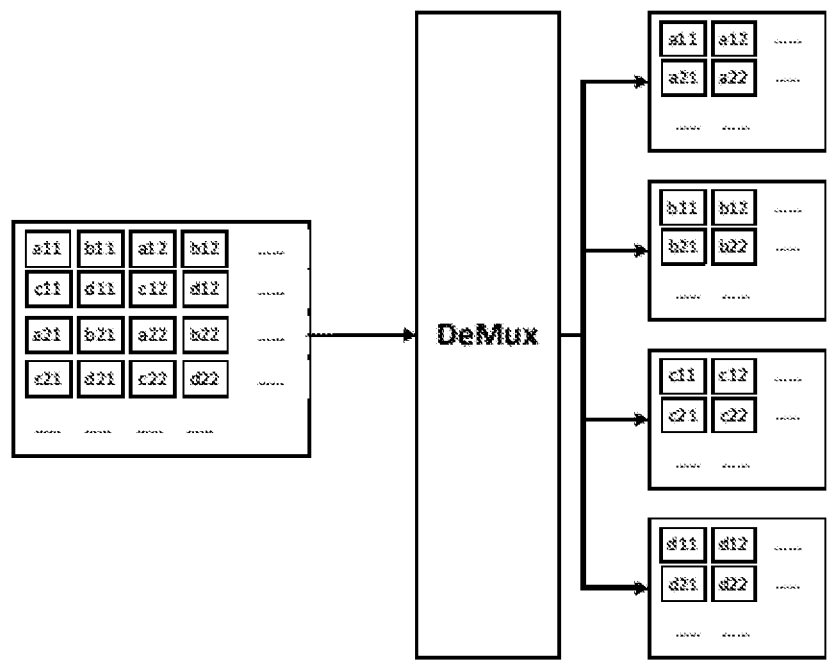
FIG. 6 is a schematic diagram illustrating a working principle of a respective one of DeMux units in some embodiments according to the present disclosure.

FIG. 6 is a schematic diagram illustrating a working principle of a respective one of DeMux units in some embodiments according to the present disclosure. Referring to FIG. 6, in some embodiments, the respective input image has a spatial scale (width× height) of 4*4, subsequent to inputting the respective input image into the DeMux unit, four divided images having a spatial scale of 2*2 is output. Optionally, the pixels of the respective input image are distributed to the four divided images.

Because the scale of the divided images output from the DeMux unit is smaller than the scale of the respective input image to the DeMux unit, a process performed by the DeMux unit is a down-sampling, which can decrease the scale of the input image. At the same time, the DeMux unit merely rearrange and divide the pixels of the respective input image to the DeMux unit, and does not discard any pixel value, which wall not result in any information loss.

In some embodiments, the Mux unit is configured to combining m' number of input images to the Mux unit to obtain a respective combined image, and to arranged pixels of the respective combined image following a second scramble rule to obtain an output image. Optionally, the first scrambling rule and the second scrambling rule are reverse with respect to each other. For example, the second scrambling rule includes moving a pixel in the position C to the position B, moving a pixel previously in the position B to the position A . . . , thereby the pixels in the output image are respectively arranged the same position as corresponding pixels in the original image inputted into the DeMux unit.

Figure 7:
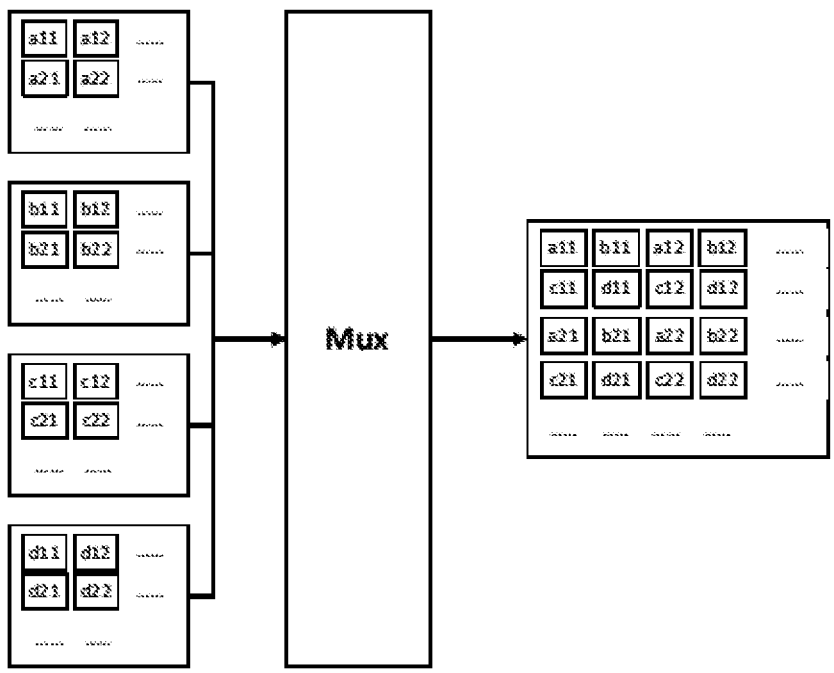
FIG. 7 is a schematic diagram illustrating a working principle of a respective one of DeMux units in some embodiments according to the present disclosure.

FIG. 7 is a schematic diagram illustrating a working principle of a respective one of Max units in some embodiments according to the present disclosure. Referring to FIG. 7, optionally, the Mux unit combines the four input images having a spatial scale of 2*2 to the Mux unit into the respective combined image having a spatial scale of 4*4. Optionally, the pixels of a respective one of the four input images is distributed to a region having a spatial scale of 2*2 respectively in the respective combined image having a spatial scale of 4*4.

Because a scale of the output image output from the Mux unit is greater than scales of m' number of input images to the Mux unit, a process performed by the Mux unit is an up-sampling, which can increase the scales of the m' number of input images. At the same time, the Mux unit merely combine and rearrange the pixels of the m' number of input images to the Mux unit, and does not discard any pixel value, which will not result in any information loss.

As used herein, the term "convolutional neural network" refers to a deep feed-forward artificial neural network. Optionally, a convolutional neural network includes a plurality of convolutional layers, a plurality of up-sampling layers, and a plurality of down-sampling layers. For example, a respective one of the plurality of convolutional layers can process an image. An up-sampling layer and a down-sampling lays can change a scale of an input image to a scale corresponding to a certain convolutional layer. For example, the up-sampling layer and the down-sampling layer can change a spatial scale (e.g., width×height) of the input image to a selected spatial scale corresponding to a certain convolutional layer. The output from the up-sampling layer or the down-sampling layer can then be processed by a convolutional layer of a corresponding scale. This enables the convolutional layer to add or extract a feature having a scale different from that of the input image.

By pre-training, parameters include, hot are not limited to, a convolutional kernel, a bias, and a weight of a convolutional layer of a convolutional neural network can be tuned. Accordingly, the convolutional neural network can be used in various situation such as image recognition, image feature extraction, and image feature addition.

As used herein, the term "analysis network" refers to a deep neural network for extracting features. Optionally, the analysis network is equivalent to a feature extracting unit of an image classification network. Optionally, the analysis network includes a plurality of convolutional layers sequentially connected. The plurality of convolutional layers are in different scales. The analysis network further includes a down-sampling layer disposed between two adjacent convolutional layers of the plurality of convolutional layers. The plurality of convolutional layers and the down sampling layers together can generate feature images (e.g., feature maps, feature data, feature signals) having different scales.

As used herein, the term "discriminator" is a classification network configured to determine whether an input image has a feature similar to a selected feature and generate a result of classification (e.g., a result of discrimination) ranging from 0 to 1. Optionally, the range of 0 to 1 of the result of classification stands for a level of similarity of the feature of the input image to the selected feature. Optionally, the range of 0 to 1 of the result of classification stands for a probability that the input image has a feature similar or identical to the selected feature. For example, when the input image has a feature identical to the selected feature, the discriminator outputs 1; when the input image doesn't have a feature identical to the selected feature, the discriminator outputs 0.

Optionally, the discriminator includes a plurality of convolutional layers, and a plurality of down-sampling layer (e.g., a plurality of pooling layer). A respective one of the plurality of down-sampling layer is between two adjacent convolutional layers of the plurality of convolutional layers. Optionally, the last convolutional layer of the plurality of convolutional layers is connected to a fully connected layer, and the fully connected layer is connected to an active layer (e.g., Sigmoid function). Therefore, the discriminator can transform the input image to a number representing the result of classification.

FIG. 1A is a schematic diagram of a structure of a neural network in some embodiments according to the present disclosure. Referring to FIG. 1A, in some embodiments, the neural network for enhancing the original image includes 2n number of sampling units SU sequentially connected; and a plurality of processing units PU. Optionally, a respective mas of the plurality of processing units PU is between two adjacent sampling units of the 2n number of sampling units SU. Optionally, n is a positive integer. Optionally, the neural network is a convolutional neural network.

In some embodiments, the mental network includes (2n−1) number of processing units PU. Optionally, any two adjacent sampling units of the 2n number of sampling units SU are connected by a respective one of the (2n−1) number of processing units PU.

Figure 1B:
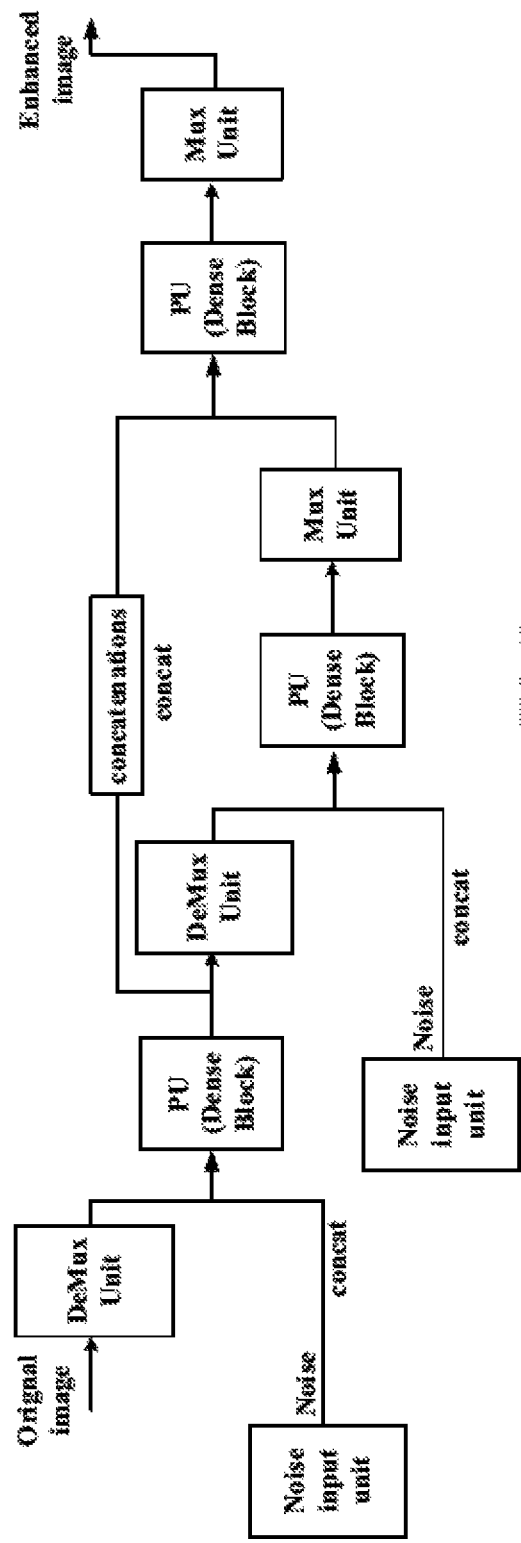
FIG. 1B is a schematic diagram of a structure of a neural network is some embodiments according to the present disclosure.

FIG. 1B is a schematic diagram of a structure of a neural network in some embodiments according to the present disclosure. In some embodiments, referring to FIG. 1B, a first sampling unit to an n-th sample unit of the 2n number of sampling units SU are DeMux units. Optionally, a respective one of the DeMux units is configured to rearrange pixels in a respective input image to the respective one of the DeMux units following a first scrambling rule to obtain a respective rearranged image, and configured to divide the respective rearranged image into m number of divided images. Optionally, m is an integer equivalent to or greater than 2. By dividing the respective rearranged image into the m number of divided images, the respective one of the DeMux units is equivalent to a down-sampling unit generating the m number of divided images having scales small than a scale of the rearranged image.

In some embodiments, an (n+1)-th sample unit to a (2n)-th sample unit of the 2n number of sampling units SU are Mux units. Optionally, a respective one of the Mux units is configured to combine respective m' number of input images to the respective one of the Mux units to obtain a respective combined image, and configured to rearrange pixels of the respective combined image following a second scramble rule to obtain an output image. Optionally, m' is an integer equivalent to or greater than 2. By combine the respective m' number of input images to the respective one of the Mux units to obtain the respective combined image, the respective one of the Mux units is equivalent to an up-sampling unit generating the respective combine image having a scale greater than scales of m' number of input images to the respective one of the Mux units.

Referring to FIG. 1A and FIG. 1B, the 2n number of sampling units SU and the plurality of processing units PU are alternatively arranged, and the first unit and the last unit of the neural network are sampling units. For example, an input to the first sampling unit (e.g., a DeMux unit) is an original images. An output from the last sampling unit (e.g., a Mux unit) is an enhanced image. An output from a respective one of a plurality of mails (including the 2n number of sampling units SU and the plurality of processing units PU) in the neural network is an input of a down-streaming unit of the respective one of a plurality of units of the neural network.

In some embodiments, a total number of DeMux units and a total number of Mux units are the same, and m is equivalent to m', the scale of the enhanced image output from the neural network and the scale of the original image input m the neural network are the same. Optionally, when m equals to m', the first scrambling rule and the second scrambling rule are reverse with respect to each other. For example, a first scramble rule includes moving a pixel in a position A to a position B, moving a pixel previously in the position B to a position C . . . ; the second scrambling rule includes moving a pixel in the position C to the position B, moving a pixel previously in the position B to the position A . . . .

In some embodiments, the respective one of the plurality of processing units PU include a plurality of convolutional blocks sequentially connected. Optionally, a respective one of the plurality of processing units PU is a DenseBlock configured to perform image enhancement on a respective input image to she respective one of the plurality of processing units PU. Optionally, image enhancement includes enhancing contrast of the respective input image.

As used herein, the term "image enhancement" or similar language is meant to understood broadly as any amendment made to the data of an image (e.g., a feature map, a date, a signal). Examples of image enhancements include, but are not limited to, red-eye removal processes, orientation of an image, image size alterations, removal of unwanted elements the image, gamma correction processes, color enhancement processes, cropping processes, and contrast adjustment processes.

Figures 2, 3A:
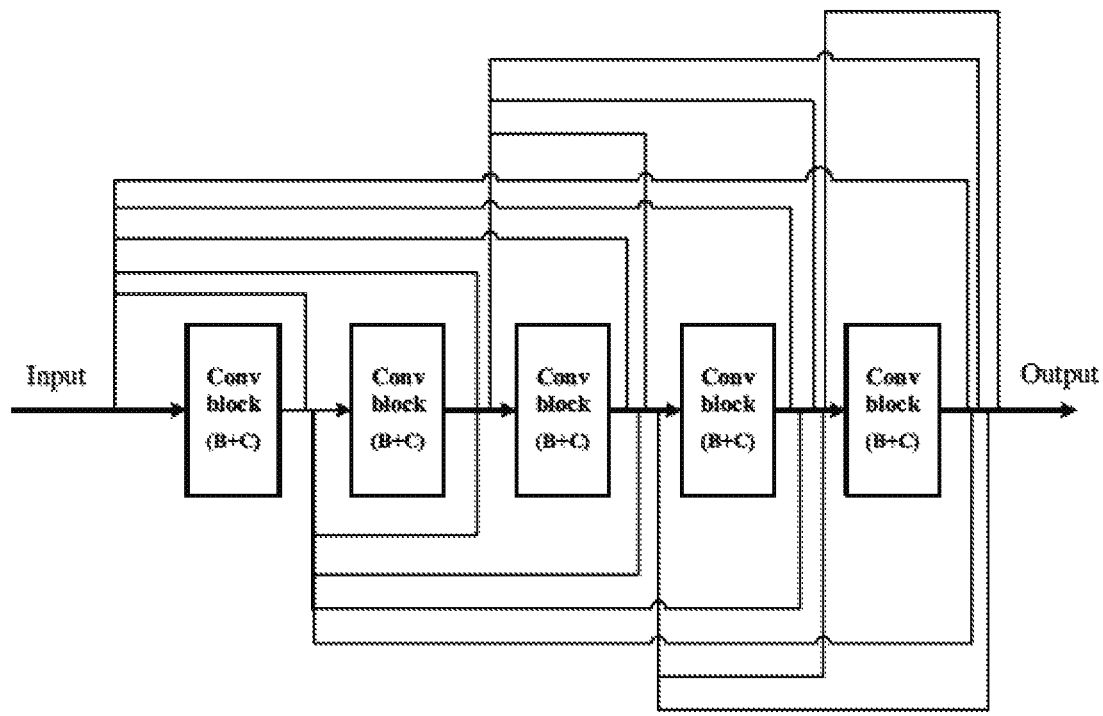
FIG. 2 is a schematic diagram of a structure of a respective one of the plurality of processing units in some embodiments according to the present disclosure.
FIG. 3A is a flow chart illustrating a method of using a neural network in some embodiments according to the present disclosure.

FIG. 2 is a schematic diagram of a structure of a respective one of the plurality of processing units in some embodiments according to the present disclosure. Referring to FIG. 2, in some embodiments, the respective one of the plurality of processing units PU (e.g., the DenseBlock) includes a plurality of convolutional blocks (Conv block) sequentially connected. Optionally, an input to a respective convolutional block in the respective one of the plurality of processing units PU includes outputs respectively from any previous convolutional blocks in the respective one of the plurality of processing units. Optionally, an output from the respective one of the plurality of processing units PU includes outputs respectively from the plurality of convolutional blocks in the respective one of the plurality of processing units. Optionally, the input to the respective convolutional block in the respective one of the plurality of processing units PU further includes an input to the respective one of the plurality of processing units PU. Optionally, the output from the respective one of the plurality of processing units PU further includes the input to the respective one of the plurality of processing units PU.

In one example, in the respective one of the plurality of processing units PU, an output from the respective one of the plurality of convolutional blocks is not only sent to an immediately next convolutional blocks, but also respectively sent to convolutional blocks following the immediately next convolutional blocks using Junctions such as a concatenate function. In another example, an input to the respective one of the plurality of convolutional blocks is outputs respectively from previous convolutional blocks.

In some embodiments, the neural network includes sampling units. A respective one of sampling units can rearrange pixels of a respective input image to the respective one of sampling units, and generate a respective rearranged image, so a respective one of processing units following the respective one of sampling units enhances the respective rearranged image output from the respective one of sampling units. Since pixels locations of the respective rearranged image is different from pixel locations of the input image of the respective one of sampling units, a result of image enhancement using the respective one of processing sods is effectively enhanced.

In some embodiments, the respective one of sampling units can change a scale of the respective input image to the respective one of sampling units, and generate a respective rescaled image having a scale different from the scale of the respective input image to the respective one of sampling units. So, the plurality of processing units can process images having different scales, which may improve processing speed and the result of image enhancement. Since the respective rescaled image is obtained by dividing the respective input image, which will not discard any pixel in the respective input image, so loss of information is avoided, resulting no adverse effect on the quality of an images.

By using DenseBlocks as the plurality of processing units, the computing efficiency of image enhancement is greatly enhanced, and a speed of convergence in a training process is increased, which may greatly speed up the training process.

In some embodiments, a respective one of the plurality of convolutional blocks includes a first conventional layer and a second convolutional layer. Optionally, the first convolutional layer has kernels with a kernel size of 1*1. Optionally, the second convolutional layer has kernels with a kernel size of 3*3.

Optionally, the respective one of the plurality of convolutional blocks has a "B+C" structure. B refers to a bottleneck layer which is a convolutional layer having kernels with the kernel, size of 1*1 and configured to reduce a scale of an image. For example, the bottleneck layer can reduce a scale of the image by generating an output image having a depth smaller than a depth of an input image, so a number of parameters in a following convolution process is reduces. C refers to a convolutional layer having kernels with a kernel size of 3*3.

In some embodiments, referring to FIG. 1A and FIG. 1B, the neural network further includes a noise input unit configured to input noise into at least one of the plurality of processing units PU. Optionally, the noise is a Gaussian noise. For example, a respective noise and a respective input image are input in the respective one of the plurality of processing units PU, and the respective one of the plurality of processing units PU outputs a respective output image having the noise, which increase feature diversities added to the respective output image.

In order to improve the result of image enhancement, the original image and noise can be input in the neural network. Optionally, the noise is input to at least one of the plurality of processing units PU using a function such as the concatenate function. Optionally, the noise is a predetermined signal. Optionally, the noise may the a randomly generated signal that meets certain conditions, such as Gaussian noise.

In some embodiments, a total number of the plurality of processing units PU is at least 3. Optionally, the neural network further includes one or more concatenations configured to input as output from a respective one of the plurality of processing units to a down-streaming processing unit having a same scale as the respective one of the plurality of processing raids. Optionally, the output from the respective one of the plurality of processing units is sent to the down-streaming processing unit having the same scale using a function such as the concatenate function. So, the down-streaming processing unit can receive more input including images processed by different processing units, which can reduce the information loss and improve the result of image enhancement.

In some embodiments, m=4, m'=4, and n=2. Referring to FIG. 1A and FIG. 1B, a total number of the 2n number of sampling anils is 4 (e.g., 2×2=4). So, a first sampling unit and the second sampling unit are DeMux units. A third sampling unit and a fourth sampling unit are Mux units. There are three groups of adjacent sampling units, e.g., the first sampling unit ang the second sampling unit are adjacent, the second sampling unit and the third sampling unit are adjacent, and the third sampling unit and the fourth sampling unit are adjacent, so, a total number of the plurality of processing units PU, each of which is between two adjacent sampling unit, is 3.

When m=4, the respective one of the DeMux units generate 4 divided images respective to the respective one input image to the respective one of the Demux units. When m'=4, the respective one of the Mux units combines 4 input images into the respective one of the Mux units and generate one output image.

In another example, the present disclosure also provides a computer-implemented method for enhancing an original image using a neural network. FIG. 3A is a flow chart illustrating a method of using a neural network in some embodiments according to the present disclosure. Referring to FIG. 3A, in some embodiments, the computer-implemented method includes inputting an original image to a neural network, described herein or trained by a method described herein, having 2n number of sampling units sequentially connected, and a plurality of processing units; and processing the original image using the 2n number of sampling units, and the plurality of processing units, thereby obtaining an enhanced image. Optionally, a respective one of the plurality of processing units is between two adjacent sampling units of the 2n number of sampling units. Optionally, a first sampling unit to an n-th sample unit of the 2n number of sampling units are DeMux units. Optionally, an (n+1)-th sample units to a (2n)-th sample unit of the 2n number of sampling units are Mux units. Optionally, the respective one of the plurality of processing units includes a plurality of convolutional blocks sequentially connected. Optionally, n is a positive integer.

In a respective one of the DeMux units, the computer-implemented method includes rearranging pixels in a respective input image to the respective one of the DeMux units following a first scrambling rule to obtain a respective rearranged image; and dividing the respective rearranged image info m number of divided images. Optionally, m is an integer equivalent to or greater than 2.

In a respective one of the Mux units, the computer-implemented method includes combining respective m' number of input images to the respective one of the Mux units to obtain a respective combined image; and rearranging pixels of the respective combined image following a second scramble rule to obtain mi output image. Optionally, m' is an integer equivalent to or greater than 2.

In some embodiments, the computer-implemented method further includes inputting outputs respectively from any previous convolutional blocks in the respective one of the plurality of processing units into a respective convolutional block in the respective one of the plurality of processing units; and outputting outputs respectively from the plurality of convolutional blocks in the respective one of the plurality of processing units from the respective case of the plurality of processing units.

In some embodiments, the computer-implemented method further includes inputting a noise into at least one of the plurality of processing units. Optionally, the noise is input to at least one of the plurality of processing units PU using a function such as the concatenate function. Optionally, the noise is a predetermined signal. Optionally, the noise may be a randomly generated signal that meets certain conditions, such as Gaussian noise.

In some embodiments, a total number of the plurality of processing units is at least 3. Optionally, the neural network further includes one or more concatenations. Optionally, the computer-implemented method further includes inputting an output from a respective one of the plurality of processing units to a down-streaming processing unit leaving a same scale as the respective one of the plurality of processing units.

In some embodiments, m=m'; and the first scrambling rule and the second scrambling rule are reverse with respect to each other. For example, a first scramble rule includes moving a pixel in a position A to a position B, moving a pixel previously in the position B to a position C . . . ; the second scrambling rule includes moving a pixel in the position C to the position B, moving a pixel previously in the position B to the position A . . . .

Optionally, m=4, m'=4, and n=2. Referring to FIG. 1A and FIG. 1B, a total number of the 2n number of sampling units is 4 (e.g., 2×2=4). So, a first sampling unit and the second sampling unit are DeMux units. A third sampling unit and a fourth sampling unit are Mux units. There are three groups of adjacent sampling units, e.g., the first sampling unit ang the second sampling unit are adjacent, the second sampling unit and the third sampling unit are adjacent, and the third sampling unit and the fourth sampling unit are adjacent, so, a total number of the plurality of processing units PU, each of which is between two adjacent sampling unit, is 3.

When m=4, the respective one of the DeMux units generate 4 divided images respective to the respective one input image to the respective one of the Demux units. When m'=4, the respective one of the Mux units combines 4 input images into the respective one of the Mux units and generate one output image.

Figure 3B:
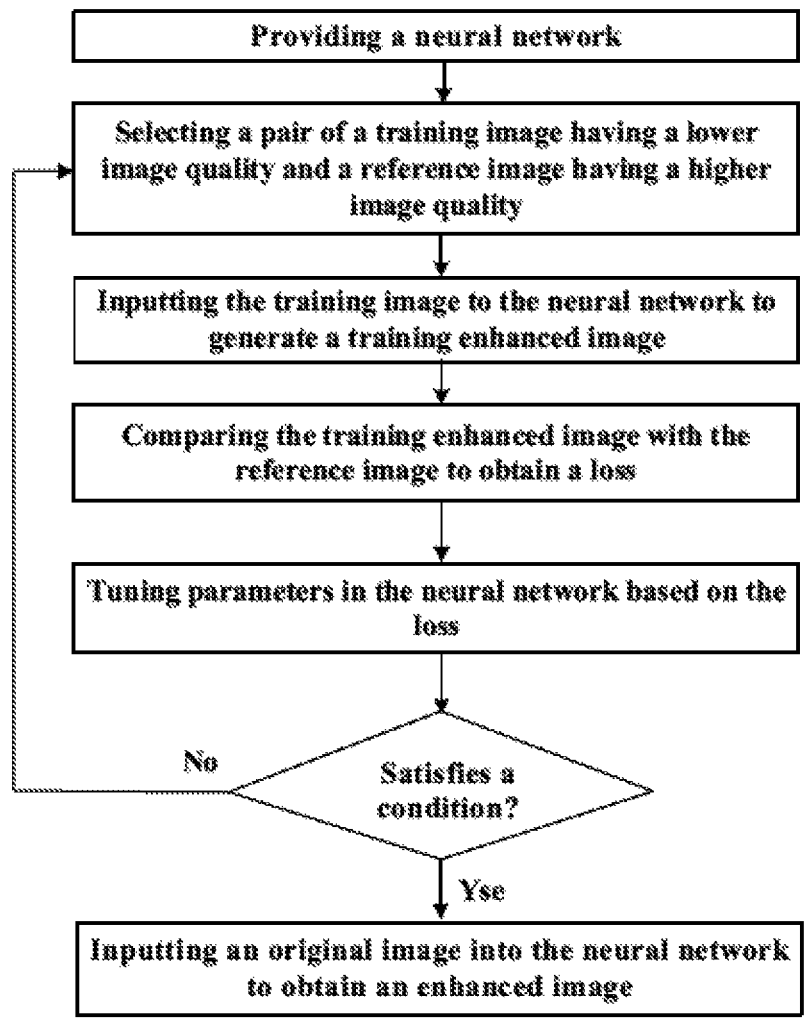
FIG. 3B is a flow chart illustrating a method of training a neural network in some embodiments according to the present disclosure.

Is some embodiments, the computer-implemented method further includes training the neural network. FIG. 3B is a flow chart illustrating a method of training a neural network in some embodiments according to the present disclosure. Referring to FIG. 3B, training the neural network includes providing a neural network having a structure described herein; selecting a pair of a training image having a lower image quality and a reference image having a higher image quality, inputting the training image to the neural network to generate a training enhanced image; comparing the training enhanced image with the reference image to obtain a loss; and tuning parameters in the neural network based on the loss.

In some embodiments, in the process of selecting the pair of the training image and the reference image, at least portions of the training image and the reference image is a same pair having same contents. In one example, the training image and the reference image have a same content, but the training image has an image quality lower than an image quality of the reference image. In one example, the training image and the reference image have a same content, but the training image has a resolution lower than a resolution of the reference image. In another example, the training image and the reference image have a same contest, but the training image has a contrast lower than a contrast of the reference image.

As used herein, the term "image quality" broadly encompasses various properties feat affect visual experience of the image, which can the affected by various factors include, but are not limited to, rescission of the image data, color depth of the image data, contrast of the image data, and whether the image has been compressed with high or low compression quality.

Optionally, the pair of the training image and the reference image can be selected from a sample database which is prepared for training the neural network herein. There are a plurality of pairs of training images and reference images, a respective one of the plurality of pairs of training images and reference images includes a training image and a reference image. Optionally, the training image and the reference image have a same content but difference contrasts. For example, the training image and the reference image are obtained by taking the same scene under different exposure conditions. One image having a relatively higher contrast is the reference image, and another one image having a relatively lower contrast is the training image.

In some embodiments, reiterating training the neural network includes reiterating training the neural network using the pair of the training image and the reference image or a different pair of a training image and a reference image. Optionally, in the process of reiterating training the neural network, the training image of the pair of the training image and the reference image can be kept, but the reference image of the pair of the training image and the reference image is replaced with a difference reference image which also has a same content as the training image. Optionally, in the process of reiterating training the neural network, the reference image of the pair of the training image and the reference image can be kept, but the training image of the pair of the training image and the reference image is replaced with a difference training image which also has a same content as the reference image.

Optionally, in order to avoid selecting the same pair of the training image and the reference image dining reiterating, the pair of the training image and the reference image used in the training process can be deleted from the sample database.

In some embodiments, in the process of inputting the training image to the neural network, the neural network described herein processes the training image to improve the contrast of the training image to obtain the training enhanced image.

In some embodiments, in the process of comparing the training enhanced image with the reference image, the reference image should correspond to the training image, for example, the training image and the reference image am obtained by taking the same scene under different exposure conditions. So, if the neural network perfectly processes the training image and obtains a perfect training enhanced image, the perfect training enhanced image should be identical to the reference image. But in fact, the training enhanced image can be very close to the reference image, but there are still some differences between the training enhanced image and the reference image, and the some differences are the loss between the training enhanced image and the reference image. The loss determines how the neural network should be adjusted.

In some embodiments, the loss includes an L1 loss. Optionally, the L1 loss is computed using a following equation (1):

$$L1 = 0.299*(abs(R_I-R_G)) + 0587*(abs(G_I-G_G)) + 0.114*(abs(B_I-B_G)) \quad (1)$$

wherein $R_I$ stands for a red component of the training enhanced image; $G_I$ stands for a green component of the training enhanced image; $B_I$ stands for a blue component of the training enhanced image; $R_G$ stands for a red component of the reference image, $G_G$ stands for a green component of the reference image; $B_G$ stands for a blue component of the reference image; and abs stands for an absolute value operation.

For example, an image has three components including a red component, a green component, and a blue component. The three components can be processed in three difference channels of the neural network. The L1 loss assigned different weights to different components, therefore, L1 loss can calculate an overall difference in color between the training enhanced image and the reference image.

In same embodiments, the loss includes a content loss. Optionally, the content loss is obtained based on a feature map of the training enhanced image and a feature map of the reference image obtained using an analysis network. For example, the feature map of the training enhanced image is extracted by the analysis network, and the feature map of the reference image is also extracted by the analysis network.

Optionally, the content loss is computed using a following equation (2):

$$L_{content} = \frac{1}{2C1} \sum_{ij} (F_{ij}^l - P_{ij}^l)^2 \quad (2)$$

wherein $F_{ij}^l$ stands for a value of a j-th position in an i-th feature sub-map of the feature map of the training enhanced image outputted from a l-th convolutional layer using an i-th kernel of the l-th convolutional layer; $P_{ij}^l$ stands for a value of a j-th position in as i-th feature sub-map of the feature map of the reference image outputted from the I-th convolutional layer using the i-th kernel of the I-th convolutional layer; C1 stands for a constant which is used for normalization.

Optionally, the analysis network includes a plurality of convolutional layers sequentially connected and a plurality of down sampling units. Optionally, a respective one of the plurality of down sampling unit is between two adjacent convolutional layers of the plurality of convolutional layers.

For example, an input of a convolutional layer can be an image, a feature map, and a data signal. An output of the convolutional layer is a feature map which having a volume of width×height×depth. A feature map includes a plurality of feature sub-maps. Optionally, a total number of the plurality of feature sub-maps is considered as the depth of the feature map. Optionally, a respective one of the plurality of feature sub-maps corresponds to a respective channel of a plurality of channels of the feature map, so, the total number of the plurality of feature sub-maps of the feature map corresponds to a total number of channels of the feature map. Optionally, a spatial scale of a feature map refers to a width×height of the feature map. A spatial scale of the respective one of the plurality of feature sub-maps is a width×height of the respective one of the plurality of feature sub-maps of the feature map. Each of the feature sub-map of the feature map has a same spatial scale as the spatial scale of the feature map. Optionally, the convolutional layer has a plurality of kernels. A respective one of the plurality of kernels performs a convolution process on the input of the convolutional layer and generates a respective one of the plurality of feature sub-maps outputted by the convolutional layer. A total number of the kernels in the convolutional layer corresponds to the total number of feature sub-maps of the feature map outputted from the convolutional layer.

The content loss embodies a difference between a content of the training enhanced image and a content of the reference image. Content includes, but is not limited to colors, shapes, and textures. In order to obtain content loss, the content of the training enhanced image and the content of the reference image should be obtained. To obtain the content of the training enhanced image, the training enhanced image should be input at the analysis network to extract the content features of the training enhanced image, after that, the analysis network outputs a content feature map of the training enhanced image. To obtain the content of the reference image, the reference image should also be input in the analysis network to extract the content features of the reference image, so the analysis network outputs a content feature map of the reference image. Subsequent to obtaining the content feature map of the training enhanced image and the content feature map of the reference image, the content loss between the training enhanced image and the reference image can be calculated based on the above equation (2).

Figure 8:
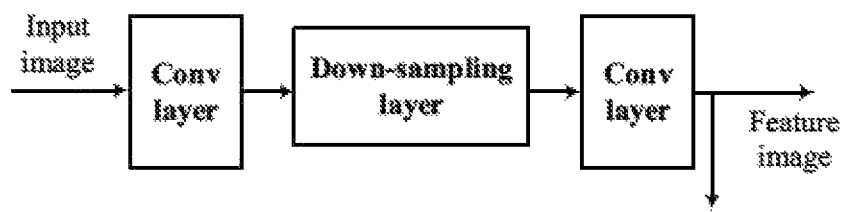
FIG. 8 is a schematic diagram of a structure of an analysis network in some embodiments according to the present disclosure.

FIG. 8 is a schematic diagram of a structure of an analysis network in some embodiments according to the present disclosure. Referring to FIG. 8, in some embodiments, the analysis network includes two convolutional layers, and a down-sampling layer between the two convolutional layers. Optionally, the analysis network includes more convolutional layers and more down-sampling layers.

For example, a l-th convolutional layer of the analysis network includes $N_l$ numbers of kernels. An output of the l-th convolutional layer is a feature map including $N_l$ numbers of feature sub-maps. Each of the $N_l$ numbers of feature sub-maps has a spatial scale (width×length) $M_l$. So, the output of the l-th convolutional layer can be stored in a matrix $A^l \in R^{N_l \times M_l}$.

In some embodiments, the loss includes a color loss. Optionally, the color loss is computed using a following equation:

$$L_{color}=abs(gaussian(I)-gaussian(G)) \quad (3)$$

wherein gaussian stands for a Gaussian blur; abs stands for an absolute value operation; I stands for the training enhanced image; G stands for the reference image. For example, the Gaussian blur is a result of blurring an image using a Gaussian function.

The color loss can be obtained by applying Gaussian blur on both the training enhanced image and the reference image. The color loss embodies a color difference between the training enhanced image and the reference image.

In some embodiments, the loss includes adversarial loss LG. Optionally, the adversarial loss is computed using a following equation:

$$LG=E_{x-Pdata(x)}[\log D(x)]+E_{z-Pz(z)}[1-\log D(G(z))] \quad (4)$$

wherein D stands for a discriminator which is a classifier configured to determine whether an image has an image quality equal to or greater than a threshold quality, when the image is determined to have the image quality equal to or greater than the threshold quality, the discriminator outputs 1, when the image is determined have the image quality less than the threshold quality, the discriminate outputs 0; G represents a convolutional neural network; Pdata stands for a plurality of images having image qualities equal to or greater than the threshold quality; x stands for a respective one of the plurality of images Pdata having image qualities equal to or greater than the threshold quality; Pz stands for a plurality of images having image qualities lower than the threshold quality; z stands for a respective one of the plurality of images Pz having image qualities lower than the threshold quality; and E stands for expectation operator.

Optionally, the adversarial loss is obtained based on an adversary between the discriminator and the neural network. For example, the discriminator is a classifier, which can be used to classify images, e.g., the classifier can be used to identify whether the image has a specific feature or specific diameter.

Figure 9:
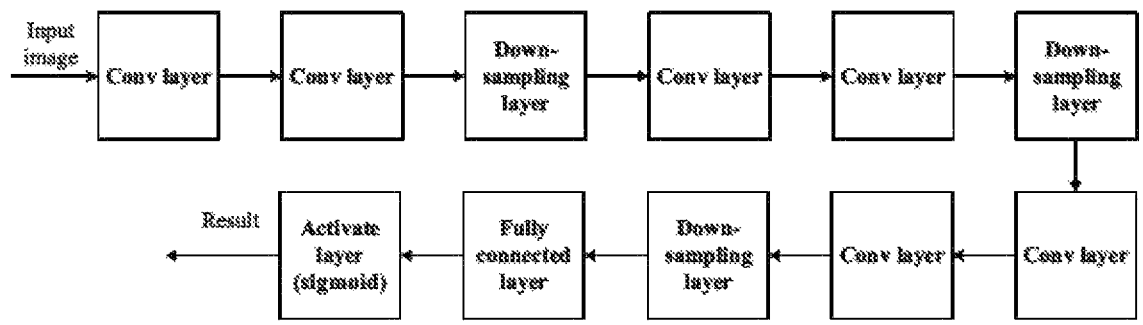
FIG. 9 is a schematic diagram of a structure of a discriminator in some embodiments according to the present disclosure.

FIG. 3 is a schematic diagram of a structure of a discriminator in some embodiments according to the present disclosure. Referring to FIG. 9, in some embodiments, the discriminator is used to determine whether an image has an image quality equal to or greater than a threshold quality. For example, the threshold quality is a threshold contrast. When the image has a contrast equal to or higher than the threshold contrast, the discriminator outputs 1. When the image has a contrast less than the threshold contrast, the discriminator outputs 0. A number output from the discriminator in the range of 0 to 1 stands for a level of the image quality or a probability that the image have the image quality equal to or greater than the threshold quality.

Optionally, the adversarial loss is a difference between a discrimination result of respective one of a plurality of reference images having the image quality equal to or greater than the threshold quality and a discrimination result of a respective one of a plurality of training enhanced images output from the neural network. In one example, the plurality of reference images correspond to the plurality of training enhanced images. In another example, there are no corresponding relations between the plurality of reference image and the plurality of training enhanced images.

For example, when the neural network described herein has a better performance in enhancing the image quality, the training enhanced image output by the neural network has a goad image quality, it is more likely dial the discriminator will determine that the image quality of the training enhanced image is equal to or greater than the threshold qualify, and output 1. Using the threshold quality, the discriminator will classify images into two groups including a group one that images having high qualify and a group two that images having low qualify, so, the discriminator outputting 1 means that the image has a high image quality. By referring to the difference between the discrimination result of the reference image having the image quality equal to or greater than the threshold quality and the discrimination result of the training enhanced image, it can be discovered whether the training enhanced image can fool the discriminator and can be classified as an image having image quality equal to or greater than a threshold qualify. If the training enhanced image can be classified as the image having image quality equal to or greater than a threshold quality, the neural network can perform a better image enhancement.

In some embodiments, the loss of the neural network includes one or a combination of the L1 loss, the content loss, the color loss, and the adversarial loss. Optionally, the loss is a weighted sum of the one or the combination of the L1 loss, the content loss, the color loss, and the adversarial loss. For example, when the L1 loss is low, the output of the neural work will not have a good image quality, so, a weight of the L1 loss should be relatively small.

Referring to FIG. 3B, in the process of tuning parameters in the neural network, because the loss represents a defect of the neural network, based on the loss, the parameters in the neural network can be tuned to improve the performance of the neural network.

Figure 4:
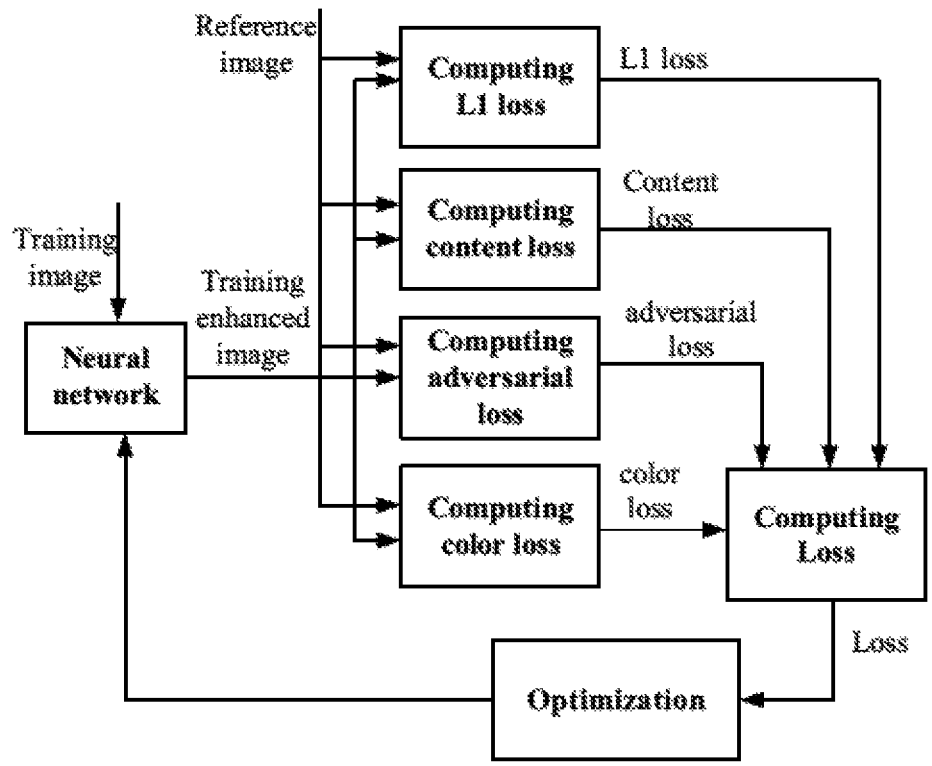
FIG. 4 is a schematic diagram of data transmitting routs in training a neural network in some embodiments according to the present disclosure.

FIG. 4 is a schematic diagram, of data transmitting routs in training a neural network in some embodiments according to the present disclosure. In some embodiments, referring to FIG. 4, the loss is output to a first optimization to optimize the neural network based on the loss.

In some embodiments, the computer-implemented method further includes training the discriminator. Optionally, training the discriminator includes tuning parameters of the discriminator based on a discriminator adversarial loss LD of the discriminator.

Optionally, the discriminator adversarial loss LD is computed using a following equation:

$$LD = -E_{x-Pdata(x)}[\log D(x)] - E_{z-Pz(z)}[1-\log D(G(z))] \quad (5)$$

wherein D stands fox a discriminator which is a classifier configured to determine whether an image has an image quality equal to or greater than a threshold quality, when the image is determined to have the image quality equal to or greater than the threshold quality, the discriminator outputs 1, when the image is determined have the image quality less than the threshold quality, the discriminator outputs 0; G represents a convolutional neural network; Pdata stands tor a plurality of images having image qualities equal to or greater than the threshold quality; x stands for a respective one of the plurality of images Pdata having image qualities equal to ox greater than the threshold quality; Pz stands for a plurality of images having image qualities lower than the threshold quality; z stands for a respective one of the plurality of images Pz having image qualities lower than the threshold quality; and E stands for expectation operator.

In the process of computing the adversarial loss, the performance of the neural network is better, the output of the neural network is more likely to fool the discriminator, for example, the output of the neural network is more likely to be classified as the image having image quality equal to or greater than the threshold quality. In order to improve the performance of the neural network, the discriminator should also the trained to effectively distinguish the training enhanced image and the reference image, and the ability of distinguishing can be improved based on the discriminator adversarial loss, furthermore, after, obtaining a better discriminator, the better discriminator can help to train the neural network to have a better performance.

Figure 5:
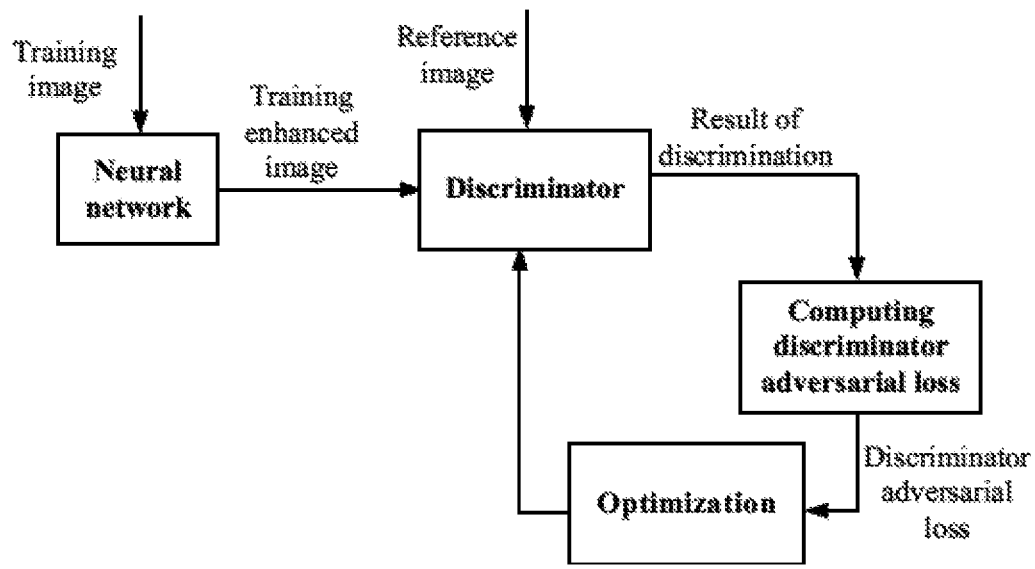
FIG. 5 is a schematic diagram of data transmitting routs in training a discriminator in some embodiments according to the present disclosure.

FIG. 5 is a schematic diagram of data transmitting routs in training a discriminator in some embodiments according to the present disclosure. Referring to FIG. 5, in some embodiments, training the discriminator includes inputting the discriminator adversarial loss into a second optimization, and the second optimization may provide a method to tune parameters of the discriminator. Optionally, the second optimization used to tune the parameters of the discriminator is different from the first optimization used to tune the parameters of the neural network.

Optionally, training the discriminator and training the neural network can be performed at a same time. Optionally, training the discriminator and training the neural network can be performed different time periods. Optionally, training the discriminator and training the neural network can be alternatively performed.

In some embodiments, referring to FIG. 3B, training ire neural network further include determining whether a required condition is satisfied. In one example, if the required condition is satisfied, the training process is completed. In another example, if the required condition haven't been satisfied, training the neural network further includes reiterating training the neural network using the pair of the training image and the reference image or a different pair of a training image and a reference image. Optionally, in the process of reiterating training the neural network, the training image of the pair of the training image and the reference image can be kept, but the reference image of the pair of the training image and the reference image is replaced with a difference reference image which also has a same content as the training image. Optionally, in the process of reiterating training the neural network, the reference image of the pair of the training image and the reference image can be kept, but the training image of the pair of the training image and the reference image is replaced with a difference training image which also has a same content as the reference image.

Various of appropriate required conditions can be used. Examples of required conditions suitable for training the neural network include, but are not limited to, a condition that the loss is converging, a condition that the loss stays under a selected, value, a condition that all the plurality of pairs of training images and reference images in the training database is used, and a condition that times of reiterating training the neural network reach a selected value.

Subsequent to training the neural network, the original image can be input in the neural network, and the neural network can generate an enhance image having an image quality higher than an image quality of the original image.

In another aspect, the present disclosure also provides an apparatus for enhancing an original image using a neural network described haem. The apparatus includes a memory; and one or more processors. Optionally, the memory and the one or more processors are connected with each other.

Optionally, the memory stores computer-executable instructions for controlling the one or more processors to input an original image to a neural network having 2n number of sampling units sequentially connected, and a plurality of processing units, wherein a respective one of the plurality of processing units is between two adjacent sampling units of the 2n number of sampling units; and process the original image using the 2n number of sampling units, and the plurality of processing units, thereby obtaining an enhanced image. Optionally, a first sampling unit to an n-th sample unit of the 2n number of sampling units are DeMux units; and (n+1)-th sample unit to a (2n)-th sample unit of the 2n number of sampling units are Mux units; and the respective one of the plurality of processing units includes a plurality of convolutional blocks sequentially connected. Optionally, n is a positive integer.

Optionally, in a respective one of the DeMux units, the computer-implemented method includes rearranging pixels in a respective input image to the respective one of the DeMux units following a first scrambling rule to obtain a respective rearranged image; and dividing the respective rearranged image into m number of divided images. Optionally, m is an integer equivalent to or greater than 2.

Optionally, in a respective one of the Mux units, the computer-implemented method includes combining respective m' number of input images to the respective one of the Mux units to obtain a respective combined image; and rearranging pixels of the respective combined image following a second scramble rule to obtain an output image. Optionally, m' is an integer equivalent to or greater than 2.

Various appropriate memory may be used in the apparatus for enhancing the original image. Examples of appropriate memory include, but are not limited to, various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, magnetic disk or tape, optical storage media sack as compact disk (CD) or DVD (digital versatile disk), and other non-transitory media. Optionally, the memory is a non-transitory memory. Various appropriate processors may be used in the apparatus for enhancing the original image. Examples of appropriate processors include, but are not limited to, a general-purpose processor, a central processing unit (CPU), a microprocessor, a digital signal processor (DSP), a controller, a microcontroller, a state machine, etc.

In some embodiments, the memory further stores computer-executable instructions for controlling the one or more processors to input outputs respectively from any previous convolutional blocks in the respective one of the plurality of processing units into a respective convolutional block in the respective one of the plurality of processing units; and output outputs respectively from the plurality of convolutional blocks in the respective one of the plurality of processing units from the respective one of the plurality of processing units.

In some embodiments, the memory further stores computer-executable instructions for controlling the one or more processors to input a noise into at least one of the plurality of processing units.

In some embodiments, a total number of the plurality of processing units is at least 3; and the neural network further includes one or more concatenations. Optionally, the memory further stores computer-executable instructions for controlling the one or more processors to input an output from a respective one of the plurality of processing units to a down-streaming processing unit having a same scale as the respective one of the plurality of processing units.

In some embodiments, m=m'. Optionally, the first scrambling rule and the second scrambling rule are reverse with respect to each other.

In some embodiments, the memory further stores computer-executable instructions for controlling the one or more processors to train the neural network. Optionally, the memory further stores computer-executable instructions for controlling the one or more processors to select a pair of a training image having a lower image quality and a reference image having a higher image quality, at least portions of the training image and the reference image in a same pair having same contents; input the training image to the neural network to generate a training enhanced image; and compare the training enhanced image with the reference image to obtain a loss. Optionally, parameters in the neural network, may be tuned based on the loss. Optionally, the memory further stores computer-executable instructions for controlling the one oar more processors to reiterate training the neural network rising the pair of the training image and the reference image or a different pair of a training image and a reference image.

Optionally, the loss includes as L1 loss.
Optionally, the loss includes a content loss.
Optionally, the loss includes a color loss.
Optionally, the loss includes an adversarial loss.

In some embodiments, the memory further stores computer-executable instructions for controlling the one or more processors to train the discriminator. Optionally, parameters of the discriminator may be tuned based on a discriminator adversarial loss of the discriminator.

In another aspect, the present disclosure provides a computer-program product including, non-transitory tangible computer-readable medium having computer-readable instructions thereon. In some embodiments, the computer-readable instructions are executable by a processor to cause the processor to perform inputting an original images to a neural network having 2n number of sampling units sequentially connected, and a plurality of processing units, wherein a respective one of the plurality of processing units is between two adjacent sampling units of the 2n number of sampling units; and processing the original image using the 2n number of sampling units, and the plurality of processing units, thereby obtaining an enhanced image. Optionally, a first sampling unit to an n-th sample unit of the 2n number of sampling units are DeMux units. Optionally, an (n+1)-th sample unit to a (2n)-th sample unit of the 2n number of sampling units are Mux units. Optionally, the respective one of the plurality of processing units includes a plurality of convolutional blocks sequentially connected. Optionally, a is a positive integer.

Optionally, in a respective one of the DeMux units, the computer-implemented method includes rearranging pixels in a respective input image to the respective one of the DeMux following a first scrambling role to obtain a respective rearranged image; and dividing the respective rearranged image into m number of divided images. Optionally, m is an integer equivalent to or greater than 2.

Optionally, in a respective one of the Mux units, the computer-implemented method includes combining respective m' number of input images to the respective one of the Mux units to obtain a respective combined image; and rearranging pixels of the respective combined image following a second scramble rule to obtain an output image. Optionally, m' is an integer equivalent to or greater than 2.

In some embodiments, the computer-readable instructions are executable by a processor to further cause the processor to perform inputting outputs respectively from any previous convolutional blocks in the respective one of the plurality of processing units into a respective convolutional block in the respective one of the plurality of processing units; and outputting outputs respectively from the plurality of convolutional blocks in the respective one of the plurality of processing units from the respective one of the plurality of processing units.

In some embodiments, the computer-readable instructions are executable by a processor to further came the processor to perform inputting a noise into at least one of the plurality of processing units.

In some embodiments, a total number of the plurality of processing units is at least 3; and the neural network further includes one or more concatenations. Optionally, the computer-readable instructions are executable by a processor to further cause the processor to perform inputting an output from a respective eras of the plurality of processing units to a down-streaming processing unit having a same scale as the respective one of the plurality of processing units.

In some embodiments, m=m'. Optionally, the first scrambling rule and the second scrambling rule are reverse with respect to each other.

In some embodiments, the computer-readable instructions are executable by a processor to further cause the processor to perform training the neural network. Optionally, the computer-readable instructions are executable by a processor to further cause the processor to perform selecting a pair of a training image having lower image quality and a reference image having a higher image quality, at least portions of the training image and the reference image in a same pair having same contents; inputting the training image to the neural network to generate a training enhanced image; and comparing the training enhanced image with the reference image to obtain a loss. Optionally, parameters in the neural network may be tuned based on the loss. Optionally, the computer-readable instructions are executable by a processor to further cause the processor to perform reiterating training the neural network using the pair of the training image and the reference image or a different pair of a training image and a reference image.

Optionally, the loss includes an L1 loss.
Optionally, the loss includes a content loss.
Optionally, the loss includes a color loss.
Optionally, the loss includes an adversarial loss.

In some embodiments, the computer-readable instructions are executable by a processor to further cause the processor to perform training the discriminator. Optionally, parameters of the discriminator may be tuned based on a discriminator adversarial loss of the discriminator.

Various illustrative neural networks, layers, units, channels, blocks, optimizations, discriminators, and other operations described in connection with the configurations disclosed herein may be implemented as electronic hardware, computer software, or combinations of both. Such neural networks, layers, units, channels, blocks, optimizations, discriminators, and other operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by as array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing device, e.g., a combination of a DSP and a microprocessor, a plurality of microprocessor, one or more microprocessors in conjunction with a DSP core, or any other such configuration. A software module may reside in a non-transitory storage medium such as RAM (random-access memory), ROM (read-only memory), nonvolatile RAM (NVRAM) such a flash RAM, erasable programmable ROM (EPROM), electrically erasable programmable ROM (EEPROM), registers, hard disk, a removable disk, or a CD-ROM; or in any other form of storage medium known is the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited to the following claims.

What is claimed is:

1. A neural network for enhancing an original image, comprising:
    2n number of sampling units sequentially connected; and
    a plurality of processing units, wherein a respective one of the plurality of processing units is between two adjacent sampling units of the 2n number of sampling units;
    wherein a first sampling unit to an n-th sample unit of the 2n number of sampling units are DeMux units, a respective one of the DeMux units is configured to rearrange pixels in a respective input image to the respective one of the DeMux units following a first scrambling rule to obtain a respective rearranged image, and configured to divide the respective rearranged image into m number of divided images;
    an (n+1)-th sample unit to a (2n)-th sample unit of the 2n number of sampling units are Mux units, a respective one of the Mux units is configured to combine respective m' number of input images to the respective one of the Mux units to obtain a respective combined image, and configured to rearrange pixels of the respective combined image following a second scramble rule to obtain an output image;
    the respective one of the plurality of processing units comprises a plurality of convolutional blocks sequentially connected; and
    m is an integer equivalent to or greater than 2, m' is an integer equivalent to or greater than 2, and n is a positive integer.

2. The neural network of claim 1, wherein an input to a respective convolutional block in the respective one of the plurality of processing units comprises outputs respectively from any previous convolutional blocks in the respective one of the plurality of processing units; and
    an output from the respective one of the plurality of processing units comprises outputs respectively from the plurality of convolutional blocks in the respective one of the plurality of processing units.

3. The neural network of claim 1, a respective one of the plurality of convolutional blocks comprises a first convolutional layer and a second convolutional layer;
    the first convolutional layer has kernels with a kernel size of 1*1; and
    the second convolutional layer has kernels with a kernel size of 3*3.

4. The neural network of claim 1, further comprising a noise input unit configured to input noise into at least one of the plurality of processing units.

5. The neural network of claim 1, wherein a total number of the plurality of processing units is at least 3; and the neural network further comprises one or more concatenations configured to input an output from a respective one of the plurality of processing units to a down-streaming processing unit having a same scale as the respective one of the plurality of processing units.

6. The neural network of claim 1, wherein m=m'; and the first scrambling rule and the second scrambling rule are reverse with respect to each other.

7. The neural network of claim 1, wherein the neural network comprises (2n−1) number of processing units; and any two adjacent sampling units of the 2n number of sampling units are connected by a respective one of the (2n−1) number of processing units.

8. A computer-implemented method for enhancing an original image using a neural network, comprising:
inputting an original image to a neural network having 2n number of sampling units sequentially connected, and a plurality of processing units, wherein a respective one of the plurality of processing units is between two adjacent sampling units of the 2n number of sampling units; and
processing the original image using the 2n number of sampling units, and the plurality of processing units, thereby obtaining an enhanced image;
wherein a first sampling unit to an n-th sample unit of the 2n number of sampling units are DeMux units;
an (n+1)-th sample unit to a (2n)-th sample unit of the 2n number of sampling units are Mux units; and
the respective one of the plurality of processing units comprises a plurality of convolutional blocks sequentially connected;
wherein, in a respective one of the DeMux units, the computer-implemented method comprises rearranging pixels in a respective input image to the respective one of the DeMux units following a first scrambling rule to obtain a respective rearranged image; and dividing the respective rearranged image into m number of divided images;
wherein, in a respective one of the Mux units, the computer-implemented method comprises combining respective m' number of input images to the respective one of the Mux units to obtain a respective combined image; and rearranging pixels of the respective combined image following a second scramble rule to obtain an output image;
wherein m is an integer equivalent to or greater than 2, m' is an integer equivalent to or greater than 2, and n is a positive integer.

9. The computer-implemented method of claim 8, further comprises:
inputting outputs respectively from any previous convolutional blocks in the respective one of the plurality of processing units into a respective convolutional block in the respective one of the plurality of processing units; and
outputting outputs respectively from the plurality of convolutional blocks in the respective one of the plurality of processing units from the respective one of the plurality of processing units.

10. The computer-implemented method of claim 8, further comprising inputting a noise into at least one of the plurality of processing units.

11. The computer-implemented method of claim 8, wherein a total number of the plurality of processing units is at least 3; and
the neural network further comprises one or more concatenations;

the computer-implemented method further comprises inputting an output from a respective one of the plurality of processing units to a down-streaming processing unit having a same scale as the respective one of the plurality of processing units.

12. The computer-implemented method of claim 8, wherein m=m'; and
the first scrambling rule and the second scrambling rule are reverse with respect to each other.

13. The computer-implemented method of claim 8, further comprising training the neural network;
wherein training the neural network comprises:
selecting a pair of a training image having a lower image quality and a reference image having a higher image quality, at least portions of the training image and the reference image in a same pair having same contents;
inputting the training image to the neural network to generate a training enhanced image;
comparing the training enhanced image with the reference image to obtain a loss; and
tuning parameters in the neural network based on the loss.

14. The computer-implemented method of claim 13, further comprising reiterating training the neural network using the pair of the training image and the reference image or a different pair of a training image and a reference image.

15. The computer-implemented method of claim 13, wherein the loss includes an L1 loss;
the L1 loss is computed using a following equation:

$$L1=0.299*(abs(R_I-R_G))+0.587*(abs(G_I-C_G))+0.114*(abs(B_I-B_G));$$

wherein $R_I$ stands for a red component of the training enhanced image; $G_I$ stands for a green component of the training enhanced image; $B_I$ stands for a blue component of the training enhanced image; $R_G$ stands for a red component of the reference image, $G_G$ stands for a green component of the reference image; $B_G$ stands for a blue component of the reference image; and abs stands for an absolute value operation.

16. The computer-implemented method of claim 13, wherein the loss includes a content loss;
the content loss is obtained based on a feature map of the training enhanced image and a feature map of the reference image obtained using an analysis network;
the analysis network comprises a plurality of convolutional layers sequentially connected and a plurality of down sampling units; and
a respective one of the plurality of down sampling unit is between two adjacent convolutional layers of the plurality of convolutional layers;
wherein the content loss is computed using a following equation:

$$L_{content} = \frac{1}{2C1}\sum_{ij}(F_{ij}^l - P_{ij}^l)^2;$$

wherein $F_{ij}^l$ stands for a value of a j-th position in an i-th feature sub-map of the feature map of the training enhanced image outputted from a l-th convolutional layer using an i-th kernel of the l-th convolutional layer; $P_{ij}^l$ stands for a value of a j-th position in an i-th feature sub-map of the feature map of the reference image outputted from the l-th convolutional layer using the i-th kernel of the l-th convolutional layer; C1 stands for a constant.

17. The computer-implemented method of claim 13, wherein the loss includes a color loss;

the color loss is computed using a following equation:

$$L_{color}=abs(gaussian(I)-gaussion(G));$$

wherein gaussian stands for a Gaussian blur, abs stands for an absolute value operation; I stands for the training enhanced image; G stands for the reference image.

18. The computer-implemented method of claim 13, wherein the loss includes an adversarial loss;

the adversarial loss is computed using a following equation:

$$LG=E_{x\sim Pdata(x)}[\log D(x)]+E_{z\sim Pz(z)}[1-\log D(G(z))];$$

wherein D stands for a discriminator which is a classifier configured to determine whether an image has an image quality equal to or greater than a threshold quality, when the image is determined to have the image quality equal to or greater than the threshold quality, the discriminator outputs 1, when the image is determined have the image quality less than the threshold quality, the discriminator outputs 0; G represents a generator (e.g., a convolutional neural network); Pdata stands for a plurality of images having image quantities equal to or greater than the threshold quality; x stands for a respective one of the plurality of images Pdata having image qualities equal to or greater than the threshold quality; Pz stands for a plurality of images having image quantities lower than the threshold quality; z stands for a respective one of the plurality of images Pz having image qualities lower than the threshold quality; and E stands for expectation operator.

19. The computer-implemented method of claim 18, further comprising training the discriminator;

wherein training the discriminator comprises tuning parameters of the discriminator based on a discriminator adversarial loss of the discriminator;

the discriminator adversarial loss is computed using a following equation:

$$LD=-E_{x\sim Pdata(x)}[\log D(x)]-E_{z\sim Pz(z)}[1-\log D(G(z))];$$

wherein D stands for a discriminator which is a classifier configured to determine whether an image has an image quality equal to or greater than a threshold quality, when the image is determined to have the image quality equal to or greater than the threshold quality, the discriminator outputs 1, when the image is determined have the image quality less than the threshold quality, the discriminator outputs 0; G represents a generator (e.g., a convolutional neural network); Pdata stands for a plurality of images having image qualities equal to or greater than the threshold quality; x stands for a respective one of the plurality of images Pdata having image qualities equal to or greater than the threshold quality; Pz stands for a plurality of images having image qualities lower than the threshold quality; z stands for a respective one of the plurality of images Pz having image qualities lower than the threshold quality; and E stands for expectation operator.

20. A computer-program product comprising non-transitory tangible computer-readable medium having computer-readable instructions thereon, the computer-readable instructions being executable by a processor to cause the processor to perform:

inputting an original image to a neural network having 2n number of sampling units sequentially connected, and a plurality of processing units, wherein a respective one of the plurality of processing units is between two adjacent sampling units of the 2n number of sampling units; and processing the original image using the 2n number of sampling units, and the plurality of processing units, thereby obtaining an enhanced image;

wherein a first sampling unit to an n-th sample unit of the 2n number of sampling units are DeMux units;

an (n+1)-th sample unit to a (2n)-th sample unit of the 2n number of sampling units are Mux units; and the respective one of the plurality of processing units comprises a plurality of convolutional blocks sequentially connected;

wherein, in a respective one of the DeMux units, the computer-implemented method comprises rearranging pixels in a respective input image to the respective one of the DeMux units following a first scrambling rule to obtain a respective rearranged image; and dividing the respective rearranged image into m number of divided images;

wherein, in a respective one of the Mux units, the computer-implemented method comprises combining respective m' number of input images to the respective one of the Mux units to obtain a respective combined image; and rearranging pixels of the respective combined image following a second scramble rule to obtain an output image;

wherein m is an integer equivalent to or greater than 2, m' is an integer equivalent to or greater than 2, and n is a positive integer.

* * * * *